June 13, 1950 T. R. WOERMBKE 2,511,489
LIGHT GENERATOR FOR BICYCLES OR THE LIKE
Filed Aug. 17, 1948 5 Sheets-Sheet 1
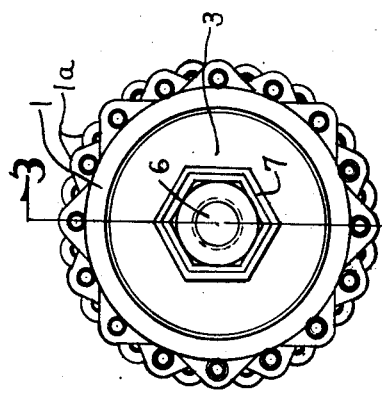
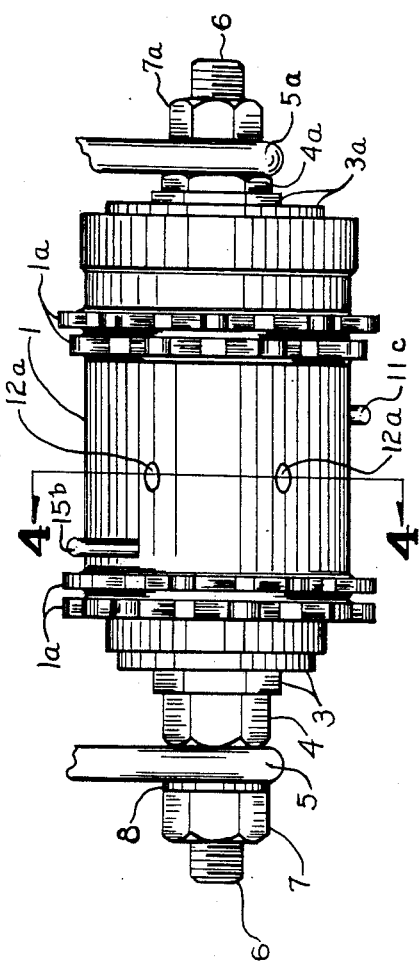
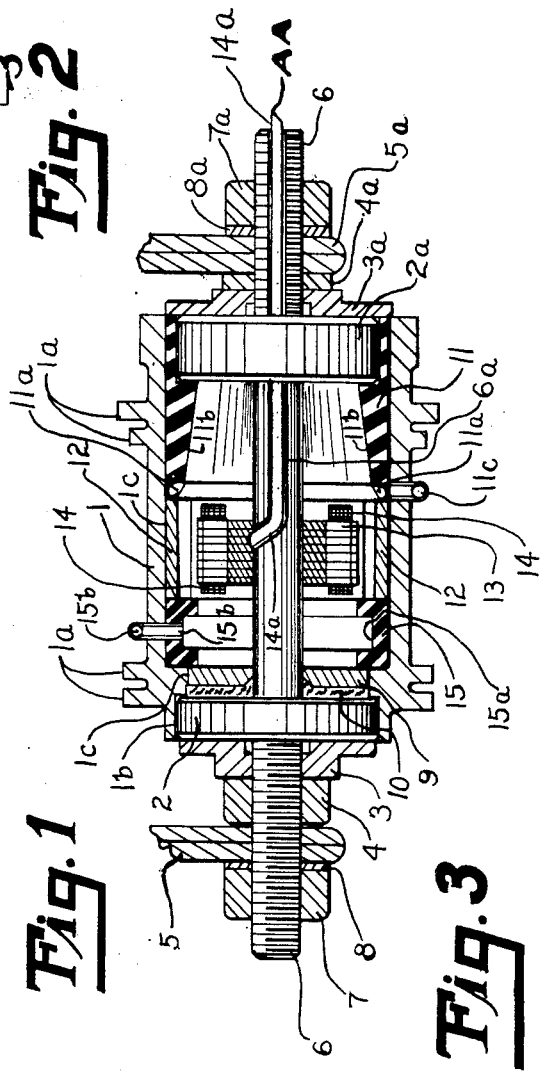
INVENTOR.
Theodore R. Woermbke
BY
ATTORNEYS June 13, 1950     T. R. WOERMBKE     2,511,489
LIGHT GENERATOR FOR BICYCLES OR THE LIKE
Filed Aug. 17, 1948     5 Sheets-Sheet 2
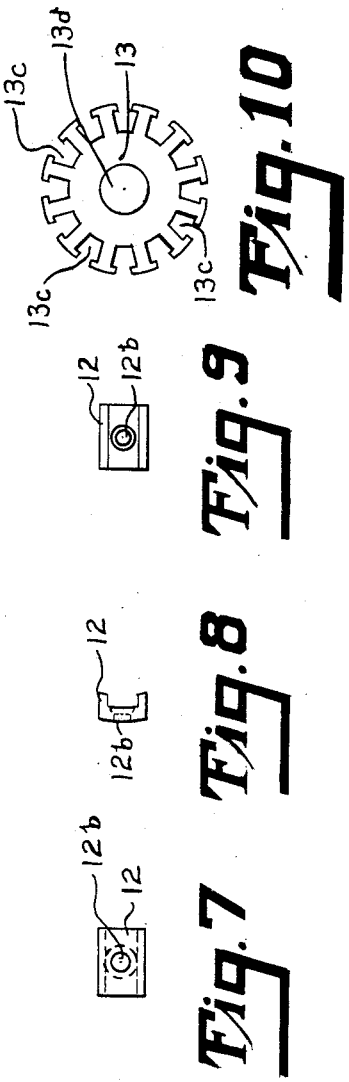
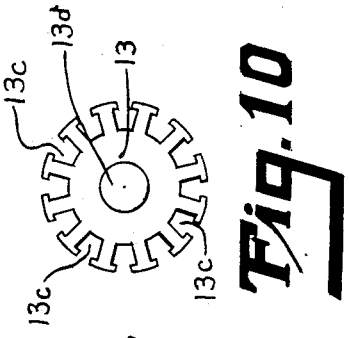
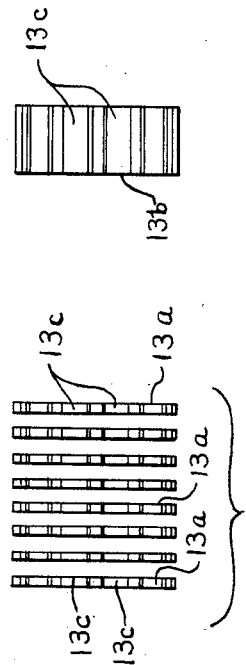
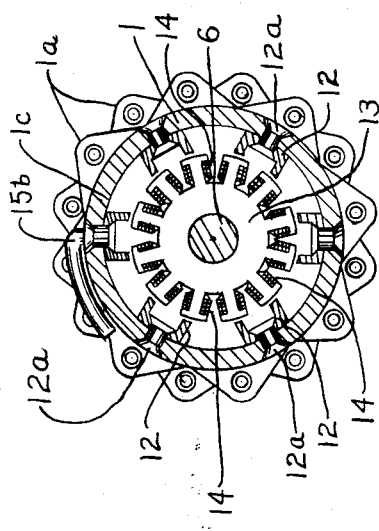
INVENTOR.
Theodore R. Woermbke
BY
ATTORNEYS June 13, 1950     T. R. WOERMBKE     2,511,489
LIGHT GENERATOR FOR BICYCLES OR THE LIKE
Filed Aug. 17, 1948     5 Sheets-Sheet 3
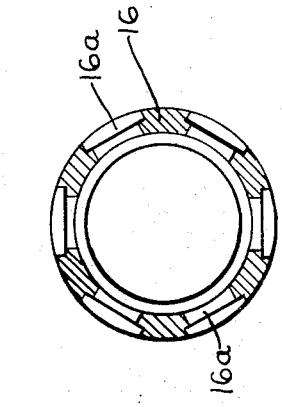
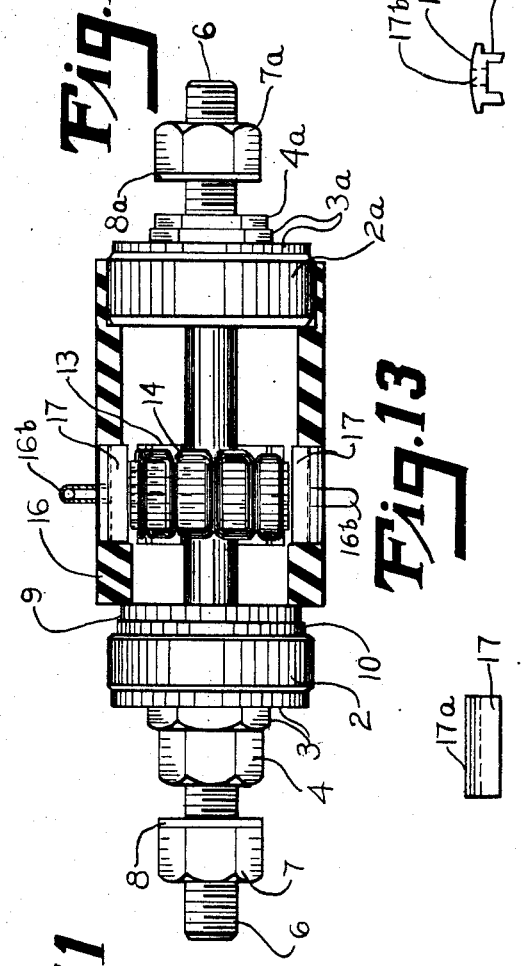
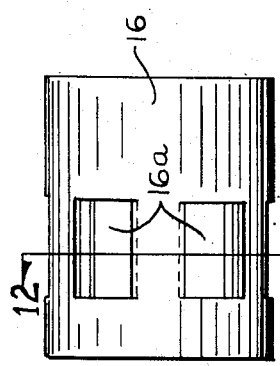

June 13, 1950     T. R. WOERMBKE     2,511,489
LIGHT GENERATOR FOR BICYCLES OR THE LIKE Filed Aug. 17, 1948     5 Sheets-Sheet 4

INVENTOR.
Theodore R. Woermbke
BY
ATTORNEYS

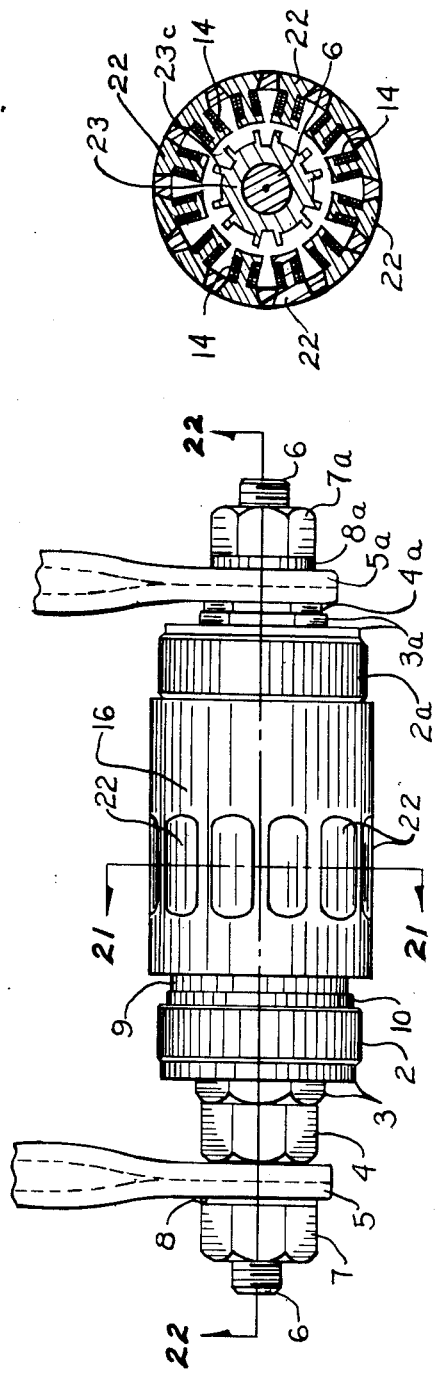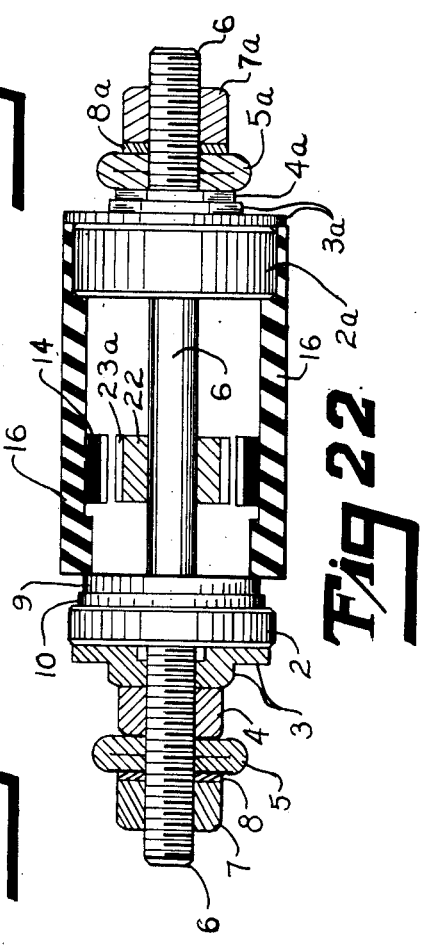

Patented June 13, 1950

2,511,489

UNITED STATES PATENT OFFICE 2,511,489

LIGHT GENERATOR FOR BICYCLES OR THE LIKE

Theodore R. Woermbke, Elmira, N. Y.

Application August 17, 1948, Serial No. 44,753

14 Claims. (Cl. 171—209)

My invention is a novel electric generator for use on bicycles and similar vehicles, the generator being housed within the wheel hub in a novel and compact assembly.

The primary object of my invention is to provide an efficient low speed generator compact enough to fit within the wheel hub of a bicycle, the rotating element of the generator being attached to the hub, and the stationary element being fixed to the spindle on which the hub is journaled.

Another object of the invention is to provide a unit having a specially designed structure which will insure proper internal ventilation and which will keep oil and water from contacting the generating elements.

A further object of the invention is to provide a generator unit which, even at low speeds, will supply adequate power to operate a light or other accessory and which will supply more power at higher speeds without burning up.

I will explain the invention with reference to the accompanying drawings which illustrate several embodiments thereof, to enable others familiar with the art to adapt and use the same; and will summarize in the claims the novel features of construction and novel combination of parts for which protection is desired.

In said drawings:

Figure 1 is an elevational view of the generator unit showing the same mounted in the fork of a bicycle.

Fig. 2 is an end view of the unit removed from the fork.

Fig. 3 is a sectional view along line 3—3 of Fig. 2.

Fig. 4 is a sectional view along line 4—4 of Fig. 1.

Fig. 5 is an exploded side view of the armature laminations.

Fig. 6 is a side view of a solid armature.

Fig. 7 is a top view of one of the permanent magnet pole pieces.

Fig. 8 is an end view of the said pole piece.

Fig. 9 is a bottom view of the said pole piece.

Fig. 10 is an end view of the armature.

Fig. 11 is a side view of the internal generator sleeve having peripheral holes for supporting the pole pieces.

Fig. 12 is a sectional view along line 12—12 of Fig. 11.

Fig. 13 is a view corresponding to Fig. 3 but showing a modified form of the generator.

Fig. 14 is a side view of a pole piece adapted to fit the holes of the sleeve shown in Figs. 11 and 12.

Fig. 15 is an end view of the said pole piece.

Fig. 20 shows an elevational view of a further modified form of the generator mounted in a bicycle fork with the wheel hub removed.

Fig. 21 shows a sectional view along line 21—21 of Fig. 20.

Fig. 22 shows a sectional view along line 22—22 of Fig. 20.

Figure 17:
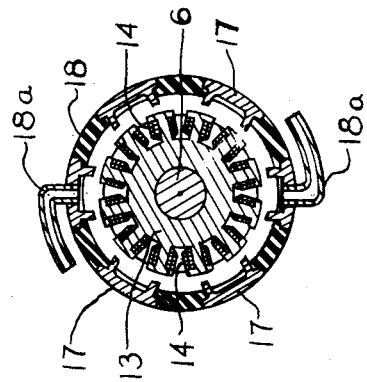
Fig. 17 is a sectional view along line 17—17 of Fig. 16.

Referring to the embodiment illustrated in Figs. 1 through 10, the wheel hub 1 has the conventional spoke mounting lugs 1a around its periphery and a bore 1b at one end for receiving the bearing 2. The bearing is held in place by an internally threaded washer 3 locked thereagainst by a nut 4, the outer end of which contacts the bicycle fork 5 which is held in place on the spindle 6 by another nut 7 and washer 8. On the inside of the bearing 2 in a reduced bore 1c is an oil sealing washer 9 and packing 10 adapted to prevent the oil from entering the generator. At the other end of the hub 1 is another bearing 2a supported in a bearing race 11 and having an internally threaded washer 3a and nut 4a holding the bearing in the race. The other member 5a of the fork 5 is held in place on spindle 6 by a nut 7a and lock washer 8a.

Within the main bore 1c of the hub 1 is mounted as by eyelets 12a an annular series of permanent magnet pole pieces 12 equally spaced therearound and having mounting holes 12b for receiving the eyelets 12a. An armature 13 is fixed on the spindle 6 opposite the pole pieces, the armature remaining stationary while the pole pieces revolve around it with the hub.

The armature 13 may be composed of a series of laminations 13a as shown in Fig. 5, or it may be one solid piece 13b as shown in Fig. 6. In either case the end view, Fig. 10, of the armature 13 shows the peripheral winding slots 13c, and the bore 13d in the center for receiving the spindle 6. The windings 14 are placed in the slots 13c, one end of the winding 14 being grounded on the spindle 6 (connection not shown) and the other end of the winding 14 being brought out on wire 14a through a bore 6a in the spindle 6 for connection to the accessories as at AA.

Between the pole pieces 12 and the oil seal washer 1c within the hub 1 is an annular ring 15, which may be made of plastic material, the ring having an internal annular groove 15a designed to trap any oil leaking through the seal washer 1c. A duct 15b extends through the ring 15 and the hub 1 serving to introduce air into the generator for cooling and to drain off trapped oil. Another annular groove 11a is provided in the bearing race sleeve 11 to collect oil running inwardly along the inner tapered surface 11b of the sleeve 11. A duct 11c also communicates this groove 11a with the outside of the hub for ventilation and drainage purposes as set forth with respect to duct 15b.

Figs. 11 through 15 illustrate a modification of the form of the generator, wherein parts similar to those in the form shown in Figs. 1 through 10 have retained the same reference characters. The hub 1 is not shown here but occupies the same position as is shown in the first form. The present form does not have the oil collecting annular grooves, but has an internal sleeve 16 replacing ring 11 in the former form. The sleeve 16 has an annular series of spaced holes as at 16a corresponding to the outer shape of the pole pieces 17 which fit snugly into the holes 16a, the outer surface 17a of each pole piece 17 being curved to match the curvature of the sleeve 16. The inner bore of the hub 1 (not shown) is a snug fit on the sleeve 16 and holds the pole pieces 17 in place in the holes. A duct 16b communicates with the air outside the hub for cooling purposes and extends into the sleeve 16 and through a hole 17b in one of the pole pieces 17. Operationally, this form is similar to the former embodiment.

Figure 19:
Fig. 19 shows the permanent magnet pole pieces which fit into the sleeve shown in Fig. 18.
Figure 16:
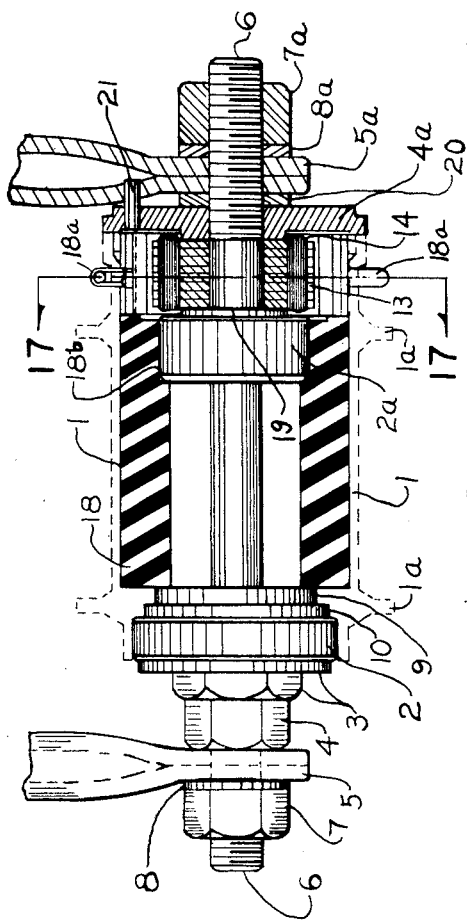
Fig. 16 is a sectional view, corresponding to Fig. 3, but showing another modified form of the generator.
Figure 18:
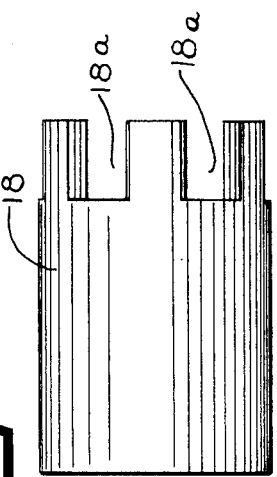
Fig. 18 is a side view of the sleeve used in the modified form shown in Fig. 16.

A third embodiment is set forth in Figs. 16 through 19. Here again, similar parts have retained the same reference characters. The sleeve 16 of the second form has been replaced by a sleeve 18 wherein the holes 18a for receiving the pole pieces 17 are in the end of the sleeve. The armature 13 is now outside the bearing 2a which is supported in recess 18b of the sleeve 18, and held therein by a washer 19 abutting against the armature 13. A threaded washer 20 is screwed on the spindle 6 to hold the armature in place and a pin 21 may be used to prevent the plate 20 from rotating with respect to fork member 5a. Ventilating ducts 18a serve the same purpose as ducts 16a in the second form, Fig. 13.

The fourth modification shown in Figs. 20 through 22 is similar to the second form except that the windings 14 are mounted on the pole pieces 22 and the armature 23 here carries the permanent magnets 23a. This form is particularly adapted for use in furnishing power to lights mounted on the spokes of the wheel for decoration since the wires from the windings will be rotating with the hub 1 of the wheel (not shown).

In each of the four above embodiments, the spindle 6 does not rotate but is fixedly secured to the bicycle fork 5. The rate of relative rotation between the armature and pole pieces is therefore determined by the speed of rotation of the hub 1, increasing power being generated with increasing speed of rotation of the hub. In each case, one side of the winding is grounded to the bicycle frame to simplify the electrical circuit, and the electrical design of the generator is such as to prevent burning out of the generator when the hub is rotating at excessive speeds. The ventilating ducts are opened in the direction of rotation of the hub to scoop in air in amounts varying with the speed of the vehicle to insure proper ventilation.

I do not limit my invention to the exact forms shown in the drawings, for obviously changes may be made within the scope of the claims.

I claim:

1. In combination with a hub having an internal bore with bearings therein journaled on a spindle fixed in a fork; an electric generator comprising an armature fixed on said spindle within the bore; an annular series of spaced field-pole pieces fixed around the inner periphery of the bore opposite the armature, means on the spindle outside the hub for maintaining the bearings in place in the bore; and ducts extending through said hub into the bore, the outer ends of the ducts opening in the direction of forward rotation of the hub to scoop in cooling air and to drain off excess liquids from said bore.

2. In a combination as set forth in claim 1, annular shoulders within said bore of the hub adjacent the inner ends of said bearings; threads on each end of said spindle; said means for holding the bearings in place comprising internally threaded washers engaging the threads on each end of said spindle and tightened inwardly thereon to hold the bearings against the shoulders, the outer peripheries of said washers having hexagonal surfaces; and lock-nuts on said threads fixing said washers against rotation.

3. In combination with a hub having an internal bore with bearings therein journaled on a spindle fixed in a fork; an electric generator comprising an armature fixed on said spindle within the bore; a longitudinal bore in said spindle; windings on said armature, the leads therefrom being brought out through said longitudinal bore; an annular series of spaced permanent-magnet pole pieces fixed around the inner periphery of the hub bore opposite the armature; means on the spindle outside of the hub for maintaining the bearings in place; means within the hub adjacent the bearings for collecting excess liquids entering therethrough; and means for ventilating said hub and for draining off said liquids.

4. In a combination as set forth in claim 3, an annular shoulder in one end of said bore adjacent the inner end of one bearing, a sleeve in the other end of the bore having a bore therein with a shoulder engaging the inner end of the other bearing; threads on each end of the spindle; said means for holding said bearings in place comprising tapped washers engaging the threads on each end of the spindle and tightened inwardly thereon to hold the bearings against the shoulders, the outer peripheries of said washers having hexagonal surfaces; and lock-nuts on said threads fixing said washers against rotation.

5. In a combination as set forth in claim 4, said means for collecting liquids comprising an annular recess at the inner end of the bore of said sleeve, the portion of the bore between the shoulder and the recess being tapered with increasing diameter toward the recess; a cylindrical ring within the hub bore adjacent the shoulder at the other end thereof, said ring having an annular recess within its bore; a washer between said ring and said shoulder, said washer fitting snugly on the spindle to prevent seepage of oil therebetween; and packing between said washer and said bearing.

6. In a combination as set forth in claim 5, said means for ventilating the hub and for draining off said liquids comprising ducts extending into said hub and communicating with said annular recess in the sleeve and the ring, respectively, the outer ends of the respective ducts being bent to follow the outer circumference of the hub along a short arc and opening in the direction of forward rotation of the hub.

7. In combination with a hub having an internal bore with bearings therein journaled on a spindle fixed in a fork; an electric generator comprising an armature fixed on said spindle within the bore; a longitudinal bore in said spindle; windings on said armature, the leads therefrom being brought out through said longitudinal bore; a sleeve in the hub bore; a series of longitudinal slots in the outer end of said sleeve and circumferentially spaced therearound; a series of permanent-magnet pole pieces, each pole piece inserted in one slot, the same being shaped to retain the respective pole pieces rigidly oriented around the outer surface of the armature and spaced therefrom; a shoulder in the bore of said hub adjacent one bearing; a second bearing on the spindle within said sleeve; a shoulder within said sleeve, said second bearing being confined between said shoulder and said armature; means for maintaining said bearings in place; a washer adjacent the shoulder within said hub, the washer fitting snugly on the spindle to prevent seepage of oil therebetween; packing between said washer and said outer bearing; and means for ventilating said hub.

8. In a combination as set forth in claim 7, threads on each end of said spindle; said means for holding the bearings in place comprising a tapped washer at each end of the spindle engaging the threads thereof, the washer at one end being tightened inwardly against said first mentioned bearing to hold the same against the shoulder in the hub, and the washer at the other end being tightened inwardly against said armature pressing the same against the second bearing to seat it against the shoulder within the sleeve; means for locking the second washer to said fork; and lock-nuts on said threads fixing said washers against rotation.

9. In a combination as set forth in claim 7, said means for ventilating the hub comprising ducts extending through said hub and said sleeve adjacent said pole pieces, the outer ends of said ducts being bent to follow the outer circumference of the hub along a short arc and opening in the direction of forward rotation of the hub.

10. In combination with a hub having an internal bore with bearings therein journaled on a spindle fixed in a fork; an electric generator comprising an armature fixed on the spindle within the bore; a sleeve within the bore having a series of circumferentially spaced longitudinal slots near the center of the sleeve, the walls of the slots expanding outwardly; a series of pole pieces, each pole piece inserted in one slot, the pole pieces being tapered to fit the walls of the slots and being held thereby in radial position around the surface of the armature and spaced therefrom; a shoulder in the bore of said hub adjacent the inner end of one bearing, a shoulder within the bore of the sleeve adjacent the other bearing; means for maintaining the bearings in place; a washer adjacent the shoulder within said hub, the washer fitting snugly on the spindle to prevent seepage of oil therebetween; packing between said washer and the bearing; and means for ventilating said hub.

11. In a combination as set forth in claim 10 threads on each end of said spindle; said means for holding the bearings in place comprising tapped washers engaging the threads on each end of said spindle and tightened inwardly thereon to hold the bearings against the shoulders, the outer peripheries of said washers having hexagonal surfaces; and lock-nuts on said threads fixing said washers against rotation.

12. In a combination as set forth in claim 10, said means for ventilating the hub comprising ducts extending through said hub and said sleeve adjacent said pole pieces, the outer ends of said ducts being bent to follow the outer circumference of the hub along a short arc and opening in the direction of forward rotation of the hub.

13. In a combination as set forth in claim 10, said spindle having a longitudinal bore therethrough communicating with the armature; said pole pieces being permanent-magnets; and winding on said armature, one end of the winding being grounded to said spindle and the other end of the winding being brought out through said longitudinal bore.

14. In a combination as set forth in claim 10, a winding on said pole pieces, one end of the winding being grounded to the hub, and the other end of the winding being brought out therethrough and rotating therewith; and said armature comprising a cylindrical body having a longitudinal bore through its center to pass said spindle and having longitudinal teeth circumferentially spaced around its periphery, said teeth comprising permanent-magnets for exciting said winding.

THEODORE R. WOERMBKE.

REFERENCES CITED

The following references are of record in the file of this patent:

UNITED STATES PATENTS

| Number | Name | Date |
|---|---|---|
| 643,095 | Holdredge | Feb. 6, 1900 |
| 2,322,969 | Rabl | June 29, 1943 |
| 2,430,163 | Dever | Nov. 4, 1947 |
| 2,434,745 | Paulson | Jan. 20, 1948 |

FOREIGN PATENTS

| Number | Country | Date |
|---|---|---|
| 200,883 | Switzerland | Feb. 1, 1939 |